United States Patent
Nakamura

(10) Patent No.: US 12,516,945 B2
(45) Date of Patent: Jan. 6, 2026

(54) INFORMATION PROCESSING APPARATUS, SYSTEM, AND INFORMATION PROCESSING METHOD

(71) Applicant: TOYOTA JIDOSHA KABUSHIKI KAISHA, Aichi-ken (JP)

(72) Inventor: Masashi Nakamura, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 174 days.

(21) Appl. No.: 18/363,738

(22) Filed: Aug. 2, 2023

(65) Prior Publication Data

US 2024/0053158 A1  Feb. 15, 2024

(30) Foreign Application Priority Data

Aug. 9, 2022  (JP) .................................. 2022-127467

(51) Int. Cl.
  *G01C 21/34*  (2006.01)
  *B60L 58/30*  (2019.01)
  *G06Q 10/20*  (2023.01)

(52) U.S. Cl.
  CPC .......... *G01C 21/3469* (2013.01); *B60L 58/30* (2019.02); *G06Q 10/20* (2013.01); *B60L 2200/18* (2013.01); *B60L 2240/642* (2013.01); *B60L 2250/16* (2013.01); *B60L 2260/46* (2013.01); *B60L 2260/50* (2013.01)

(58) Field of Classification Search
  CPC ............. B60W 2556/10; B60W 20/12; B50W 2260/52; G01R 31/392; H01M 10/48
  See application file for complete search history.

(56) References Cited

U.S. PATENT DOCUMENTS

| | | | |
|---|---|---|---|
| 2003/0061182 A1* | 3/2003 | Singh | G01R 31/392 706/2 |
| 2003/0106726 A1* | 6/2003 | Yoshii | B60K 6/48 903/917 |
| 2004/0091759 A1* | 5/2004 | Harrington | G01R 31/389 714/48 |
| 2008/0006461 A1* | 1/2008 | Naganuma | B60H 1/00428 180/69.4 |
| 2010/0007481 A1* | 1/2010 | Uchida | B60L 53/65 340/455 |
| 2010/0235025 A1* | 9/2010 | Richter | B60W 10/26 701/22 |
| 2010/0250162 A1* | 9/2010 | White | G01R 31/392 702/63 |
| 2017/0282744 A1* | 10/2017 | Koo | B60W 30/1886 |
| 2019/0277647 A1* | 9/2019 | Adetola | B60H 1/3232 |

(Continued)

FOREIGN PATENT DOCUMENTS

| | | | | |
|---|---|---|---|---|
| JP | 2010181986 A | * | 8/2010 | .......... B60L 11/1816 |
| JP | 2018106841 A | | 7/2018 | |

(Continued)

*Primary Examiner* — Logan M Kraft
*Assistant Examiner* — Joshua Campbell
(74) *Attorney, Agent, or Firm* — HAUPTMAN HAM, LLP

(57) ABSTRACT

An information processing apparatus includes a controller. The controller executes an assignment process to preferentially assign an operation route that places a smaller load on a fuel cell among a plurality of operation routes to a fuel cell vehicle including a fuel cell that has a higher degree of deterioration among a plurality of fuel cell vehicles.

20 Claims, 3 Drawing Sheets

(56) References Cited

U.S. PATENT DOCUMENTS

| | | | |
|---|---|---|---|
| 2020/0207326 A1* | 7/2020 | Wenger | B60W 20/12 |
| 2020/0255024 A1* | 8/2020 | Hirasawa | B60W 50/14 |
| 2020/0273134 A1* | 8/2020 | Yoshida | H04W 4/02 |
| 2021/0374816 A1 | 12/2021 | Yamasaki et al. | |
| 2022/0099743 A1* | 3/2022 | Subbotin | G01R 31/367 |
| 2022/0359897 A1* | 11/2022 | Kim | H01M 8/04955 |

FOREIGN PATENT DOCUMENTS

| | | |
|---|---|---|
| JP | 2019096143 A | 6/2019 |
| JP | 2020134994 A | 8/2020 |
| JP | 2021191159 A | 12/2021 |
| JP | 2021192221 A | 12/2021 |
| JP | 2022083278 A | 6/2022 |

\* cited by examiner

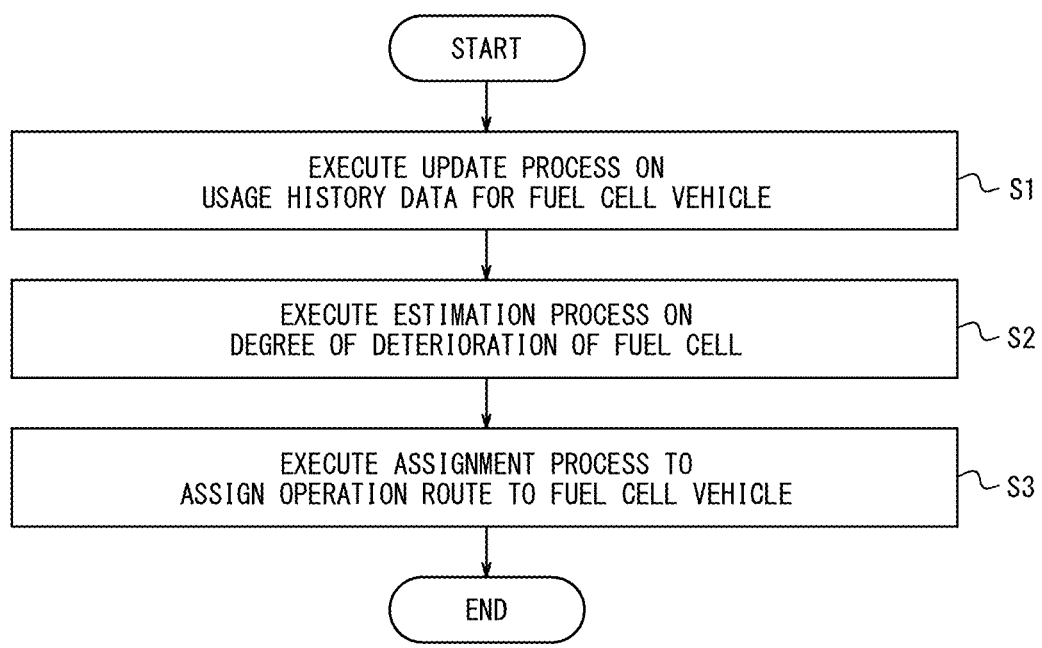

INFORMATION PROCESSING APPARATUS, SYSTEM, AND INFORMATION PROCESSING METHOD

CROSS-REFERENCE TO RELATED APPLICATION

This application claims priority to Japanese Patent Application No. 2022-127467 filed on Aug. 9, 2022, the entire contents of which are incorporated herein by reference.

TECHNICAL FIELD

The present disclosure relates to an information processing apparatus, a system, and an information processing method.

BACKGROUND

It is known that when a vehicle equipped with a fuel cell system is driven uphill, the fuel cell of the vehicle is subjected to a continuous high-load demand, and the performance of the fuel cell may deteriorate (see Patent Literature (PTL) 1).

CITATION LIST

Patent Literature

PTL 1: JP 2018-106841 A

SUMMARY

In the case of using a plurality of fuel cell vehicles, various advantages can be obtained if the degree of deterioration of the fuel cell included in each of the fuel cell vehicles can be equalized. For example, if the degree of deterioration of the fuel cell included in each of the fuel cell vehicles can be equalized, the same timing for maintenance on each of the fuel cell vehicles can be set, facilitating management of the timing for maintenance. It is therefore desirable to equalize the degree of deterioration of the fuel cell included in each of the fuel cell vehicles.

It would be helpful to provide technology for equalizing the degree of deterioration of the fuel cell included in each fuel cell vehicle in a plurality of fuel cell vehicles.

An information processing apparatus according to an embodiment of the present disclosure includes: a controller configured to execute an assignment process to preferentially assign an operation route that places a smaller load on a fuel cell among a plurality of operation routes to a fuel cell vehicle including a fuel cell that has a higher degree of deterioration among a plurality of fuel cell vehicles.

A system according to an embodiment of the present disclosure includes: the information processing apparatus recited in claim 1; and a plurality of fuel cell vehicles.

An information processing method according to an embodiment of the present disclosure includes: executing an assignment process to preferentially assign an operation route that places a smaller load on a fuel cell among a plurality of operation routes to a fuel cell vehicle including a fuel cell that has a higher degree of deterioration among a plurality of fuel cell vehicles.

According to an embodiment of the present disclosure, technology for equalizing the degree of deterioration of the fuel cell included in each fuel cell vehicle in a plurality of fuel cell vehicles can be provided.

BRIEF DESCRIPTION OF THE DRAWINGS

In the accompanying drawings:

FIG. 3 is a flowchart illustrating operations of an information processing apparatus illustrated in FIG. 2.

DETAILED DESCRIPTION

An embodiment of the present disclosure will be described below, with reference to the drawings.

(Configuration of System)

Figure 1:
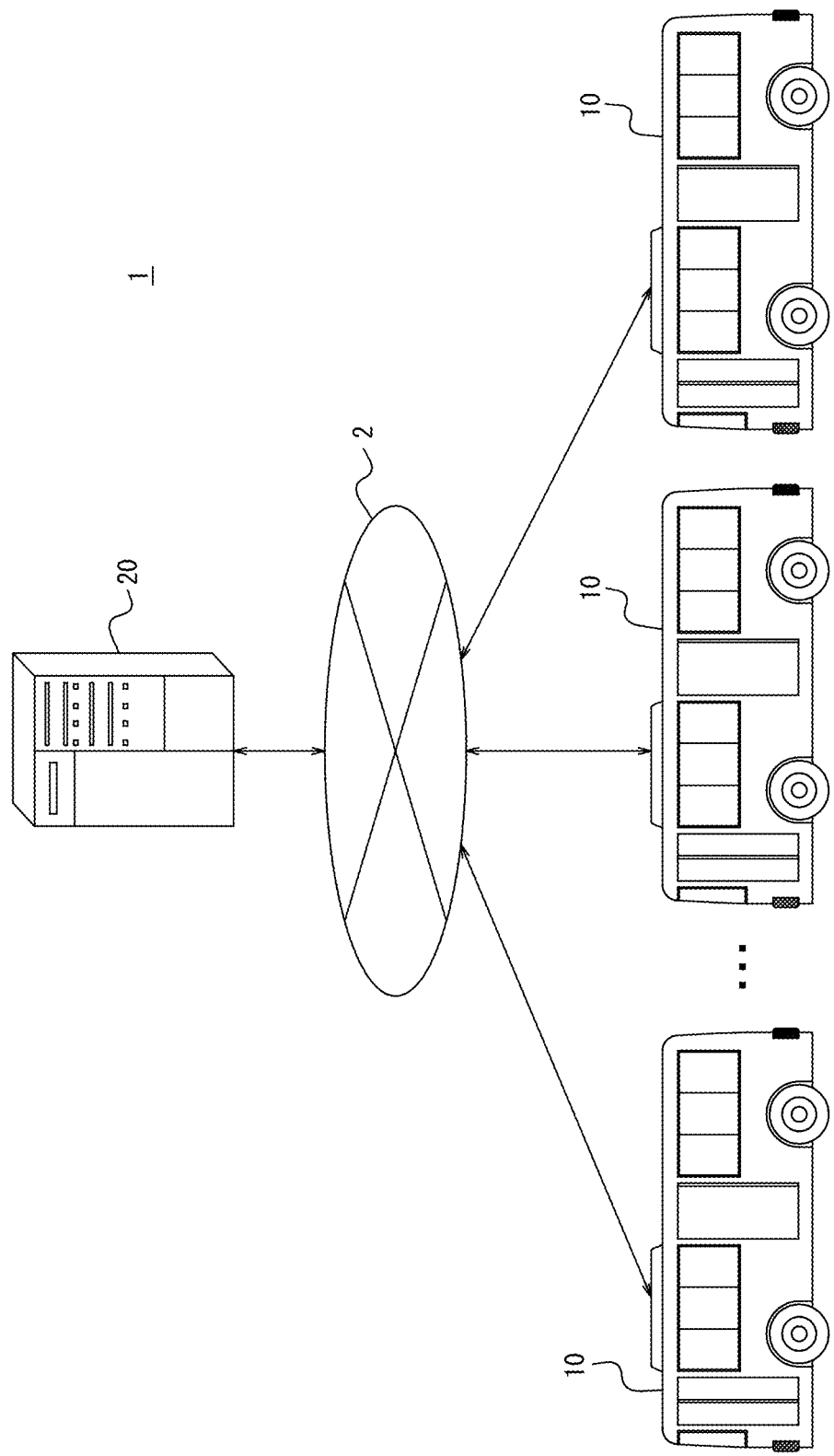
FIG. 1 is a diagram illustrating a schematic configuration of a system according to an embodiment of the present disclosure.

As illustrated in FIG. 1, a system 1 includes a plurality of fuel cell vehicles 10 and an information processing apparatus 20. The plurality of fuel cell vehicles 10 and the information processing apparatus 20 can communicate via a network 2. The network 2 may be any network including a mobile communication network, the Internet, or the like.

The fuel cell vehicle 10 is powered by a fuel cell. The fuel cell vehicle 10 is, for example, a fuel cell electric vehicle (FCEV). The fuel cell vehicle 10 travels the operation route assigned by the information processing apparatus 20. In the present embodiment, the fuel cell vehicle 10 is a bus. However, the fuel cell vehicle 10 is not limited to being a bus. The fuel cell vehicle 10 may be any vehicle powered by a fuel cell. The fuel cell vehicle 10 may be a dedicated Mobility as a Service (MaaS) vehicle.

The fuel cell vehicle 10 may be driven by a driver. The driving of the fuel cell vehicle 10 may be partly automated at any level. The level of automation is, for example, one of level 1 to level 5 according to the classification of the Society of Automotive Engineers (SAE).

The information processing apparatus 20 assigns an operation route to the fuel cell vehicle 10. The information processing apparatus 20 may determine the operation schedule for a plurality of fuel cell vehicles 10, i.e. buses. The bus operation schedule includes, for example, at least one of the operation route the bus is scheduled to travel, the arrival time when the bus arrives at a stop on the operation route, and the departure time when the bus departs from a stop on the operation route. The information processing apparatus 20 may be operated by a business that operates buses that are the fuel cell vehicles 10.

The information processing apparatus 20 is, for example, a dedicated computer configured to function as a server, a general purpose personal computer, a cloud computing system, or the like.

<Fuel Cell Vehicle Configuration>

Figure 2:
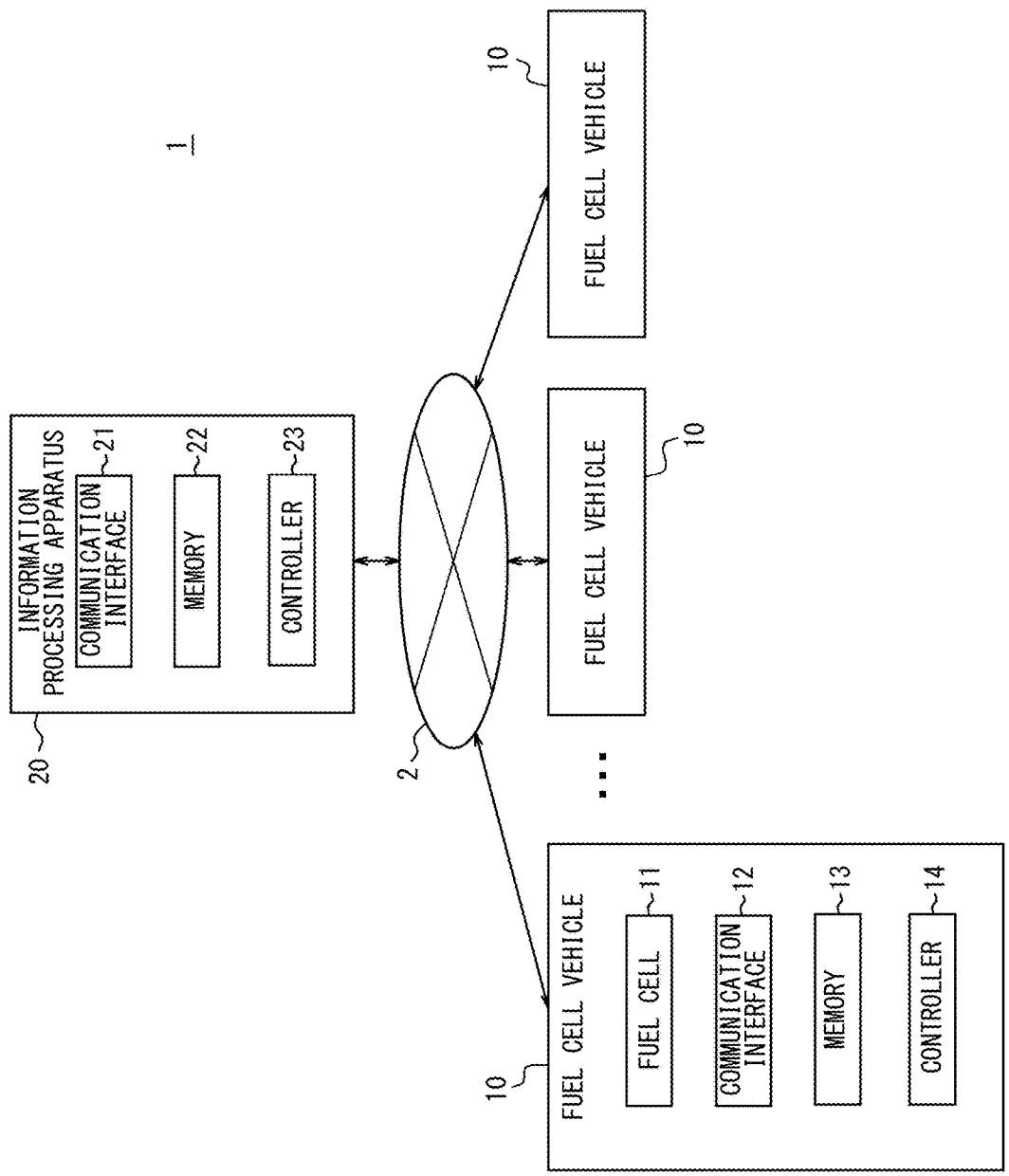
FIG. 2 is a block diagram of the system illustrated in FIG. 1.

As illustrated in FIG. 2, the fuel cell vehicle 10 includes a fuel cell 11, a communication interface 12, a memory 13, and a controller 14.

The fuel cell 11 generates electricity by producing electrical energy through a chemical reaction between hydrogen and oxygen. The electrical energy produced by the fuel cell 11 powers the fuel cell vehicle 10. For example, the fuel cell vehicle 10 runs by driving a motor with the energy generated by the fuel cell 11.

The communication interface 12 is configured to include at least one communication module for connection to the network 2. The communication module is a communication module compliant with a mobile communication standard such as Long Term Evolution (LTE), 4th Generation (4G), or 5th Generation (5G). However, the communication module is not limited to this. The communication module may be compliant with any communication standard.

The memory 13 is configured to include at least one semiconductor memory, at least one magnetic memory, at least one optical memory, or a combination of at least two of these. The semiconductor memory is, for example, random access memory (RAM) or read only memory (ROM). The RAM is, for example, static random access memory (SRAM), dynamic random access memory (DRAM), or the like. The ROM is, for example, electrically erasable programmable read only memory (EEPROM) or the like. The memory 13 may function as a main memory, an auxiliary memory, or a cache memory. The memory 13 stores data to be used for operations of the fuel cell vehicle 10 and data obtained by the operations of the fuel cell vehicle 10.

The controller 14 is configured to include at least one processor, at least one dedicated circuit, or a combination thereof. The processor is, for example, a general purpose processor such as a Central Processing Unit (CPU) or a Graphics Processing Unit (GPU), or a dedicated processor that is dedicated to a specific process. Examples of dedicated circuits can include a Field-Programmable Gate Array (FPGA) and an Application Specific Integrated Circuit (ASIC). The controller 14 executes processes related to the operations of the fuel cell vehicle 10 while controlling components of the fuel cell vehicle 10.

The functions of the fuel cell vehicle 10 can be realized by execution of a vehicle program according to the present embodiment by a processor corresponding to the controller 14. That is, the functions of the fuel cell vehicle 10 are realized by software. The vehicle program can cause a computer to function as the fuel cell vehicle 10 by causing the computer to execute the operations of the fuel cell vehicle 10. That is, the computer can function as the fuel cell vehicle 10 by executing the operations of the fuel cell vehicle 10 in accordance with the vehicle program.

Some or all of the functions of the fuel cell vehicle 10 may be realized by a dedicated circuit corresponding to the controller 14. That is, some or all of the functions of the fuel cell vehicle 10 may be realized by hardware.

The controller 14 may acquire, via a Controller Area Network (CAN), history data on the accelerator position of the fuel cell vehicle 10 from an Electronic Control Unit (ECU) that controls the accelerator of the fuel cell vehicle 10. The controller 14 may also acquire, via the CAN, history data on the speed of the fuel cell vehicle 10 from the ECU that controls the speed of the fuel cell vehicle 10. The controller 14 may transmit the acquired history data on the accelerator and speed to the information processing apparatus 20 via the network 2 using the communication interface 12. For example, when the controller 14 completes a day's operation of the fuel cell vehicle 10 as a bus, the controller 14 may transmit the history data on the accelerator position and speed of the fuel cell vehicle 10 for that day to the information processing apparatus 20.

The controller 14 may acquire history data on the number of passengers in the fuel cell vehicle 10 by, for example, communicating with a terminal apparatus in the fuel cell vehicle 10 via a communication line. The terminal apparatus may be a terminal apparatus that executes a process of receiving fares from customers by contactless communication with a passenger's contactless card for paying the fare. The controller 14 may control the communication interface 12 to transmit the acquired history data on the number of passengers to the information processing apparatus 20 via the network 2. For example, when the controller 14 completes a day's operation of the fuel cell vehicle 10 as a bus, the controller 14 may transmit the history data on the number of passengers for that day to the information processing apparatus 20.

The controller 14 may acquire, via the CAN, usage history data for the fuel cell 11 from the ECU that controls the fuel cell 11. The usage history data for the fuel cell 11 includes, for example, at least any one of history data on the water temperature of the fuel cell 11, data on the number of times the fuel cell 11 was switched to the power generating state or non-power generating state, history data on the driving of injectors, and history data on the driving of auxiliary equipment of the fuel cell 11. The injector is a device that supplies hydrogen or oxygen to the fuel cell 11. The auxiliary equipment of the fuel cell 11 is, for example, a hydrogen pump. The controller 14 may control the communication interface 12 to transmit the acquired usage history data for the fuel cell 11 to the information processing apparatus 20 via the network 2. For example, when the controller 14 completes a day's operation of the fuel cell vehicle 10 as a bus, the controller 14 may transmit the usage history data for the fuel cell 11 for that day to the information processing apparatus 20.

The controller 14 may acquire, via the CAN, data on the current-voltage characteristics (I-V characteristics) of the fuel cell 11 from the ECU that controls the fuel cell 11. The current-voltage characteristics of the fuel cell 11 indicate the relationship between the current value and the voltage value outputted from the fuel cell 11. The controller 14 may control the communication interface 12 to transmit the acquired current-voltage characteristics of the fuel cell 11 to the information processing apparatus 20 via the network 2. The controller 14 may acquire the data on the current-voltage characteristics of the fuel cell 11 at time intervals set in advance and transmit the acquired current-voltage characteristics of the fuel cell 11 to the information processing apparatus 20. This time interval may be set based on the operation route, the operation schedule, or the like.

<Information Processing Apparatus Configuration>

As illustrated in FIG. 2, the information processing apparatus 20 includes a communication interface 21, a memory 22, and a controller 23.

The communication interface 21 is configured to include at least one communication module for connection to the network 2. For example, the communication module is a communication module compliant with a standard such as a wired Local Area Network (LAN) or a wireless LAN. However, the communication module is not limited to this. The communication module may be compliant with any communication standard. The communication interface 21 is connectable to the network 2 via a wired LAN or a wireless LAN using the communication module.

The memory 22 is configured to include at least one semiconductor memory, at least one magnetic memory, at least one optical memory, or a combination of at least two of these. The semiconductor memory is, for example, RAM, ROM, or the like. The RAM is, for example, SRAM, DRAM, or the like. The ROM is, for example, EEPROM or the like. The memory 22 may function as a main memory, an auxiliary memory, or a cache memory. The memory 22 stores data to be used in the operations of the information processing apparatus 20 and data obtained by the operations of the information processing apparatus 20.

The memory 22 stores, for example, data on the usage history of each of the fuel cell vehicles 10. The memory 22 stores, for example, data on the gradient of the road surface and the friction coefficient of the road surface for each of the operation routes.

The memory 22 stores data on the load on the fuel cell 11 on each of the operation routes. The load on the fuel cell 11 on an operation route is the load on the fuel cell 11 of the fuel cell vehicle 10 as the fuel cell vehicle 10 travels that operation route. The load on the fuel cell 11 on the operation route may be estimated based on the gradient of the road surface along the operation route. The load on the fuel cell 11 on the operation route may be estimated to be greater as the gradient of the road surface on the operation route is greater. The load on the fuel cell 11 on the operation route may be estimated based on the results of counting the number of hills included in the operation route. The load on the fuel cell 11 on the operation route may be estimated based on the gradient of the road surface and the distance of the road surface. The load on the fuel cell 11 on the operation route may be estimated by the controller 23 or by another information processing apparatus.

The controller 23 is configured to include at least one processor, at least one dedicated circuit, or a combination thereof. The processor is, for example, a general purpose processor such as a CPU or a GPU, or a dedicated processor that is dedicated to a specific process. The dedicated circuit is, for example, an FPGA, an ASIC, or the like. The controller 23 executes processes related to the operations of the information processing apparatus 20 while controlling components of the information processing apparatus 20.

The functions of the information processing apparatus 20 may be implemented by a processor corresponding to the controller 23 executing a processing program according to the present embodiment. That is, the functions of the information processing apparatus 20 may be implemented by software. The processing program enables a computer to function as the information processing apparatus 20 by causing the computer to execute the operations of the information processing apparatus 20. That is, the computer functions as the information processing apparatus 20 by executing the operations of the information processing apparatus 20 in accordance with the processing program.

Some or all of the functions of the information processing apparatus 20 may be realized by a dedicated circuit corresponding to the controller 23. That is, some or all of the functions of the information processing apparatus 20 may be realized by hardware.

<Update Process>

The controller 23 updates the usage history data for the fuel cell vehicle 10 in the memory 22 at a first time set in advance. The first time may be a time at or after the end time when the fuel cell vehicle 10 finishes its operation as a bus, but before the estimation process described below is executed. The usage history data for the fuel cell vehicle 10 may include any data related to the deterioration of the fuel cell 11.

The usage history data for the fuel cell vehicle 10 may, for example, include at least one of history data on the accelerator position of the fuel cell vehicle 10, history data on the on-board weight of the fuel cell vehicle 10, and history data on the driving resistance of the fuel cell vehicle 10. The amount of electrical energy produced by the fuel cell 11 of the fuel cell vehicle 10 can vary depending on the accelerator position of the fuel cell vehicle 10, the on-board weight of the fuel cell vehicle 10, or the driving resistance of the fuel cell vehicle 10. As the amount of electrical energy produced by the fuel cell 11 changes, the degree of deterioration of the fuel cell 11 can change. In other words, the history data on the accelerator position of the fuel cell vehicle 10, history data on the on-board weight of the fuel cell vehicle 10, and history data on the driving resistance of the fuel cell vehicle 10 can be considered data related to the deterioration of the fuel cell 11.

Regarding the history data on the accelerator position, the controller 23 may receive, using the communication interface 21, history data on the accelerator position of a fuel cell vehicle 10 from the fuel cell vehicle 10 via the network 2. The controller 23 may use the received history data on the accelerator position to update the history data on the accelerator position included in the usage history data for the fuel cell vehicle 10 in the memory 22.

Regarding the history data on the on-board weight, the controller 23 may receive, using the communication interface 21, history data on the number of passengers of a fuel cell vehicle 10 from the fuel cell vehicle 10 via the network 2. The controller 23 may calculate the history data on the on-board weight of the fuel cell vehicle 10 based on the received history data on the number of passengers. For example, the controller 23 calculates the history data on the on-board weight of the fuel cell vehicle 10 using the received history data on the number of passengers, data on the average weight of the passengers, and the like. The controller 23 may use the calculated on-board weight of the fuel cell vehicle 10 to update the history data on the on-board weight included in the usage history data for the fuel cell vehicle 10 in the memory 22.

Regarding the history data on the driving resistance, the controller 23 may receive, using the communication interface 21, history data on the speed of a fuel cell vehicle 10 from the fuel cell vehicle 10 via the network 2. The controller 23 may also identify the operation route driven by the fuel cell vehicle 10 using the operation schedule for the fuel cell vehicle 10. The controller 23 may acquire data on the friction coefficient of the road surface for the identified operation route from the memory 22. The controller 23 may calculate the history data on the travel resistance of the fuel cell vehicle 10 using the received history data on the speed of the fuel cell vehicle 10, the acquired data on the friction coefficient of the road surface, and the history data on the on-board weight of the fuel cell vehicle 10. The controller 23 may use the calculated driving resistance of the fuel cell vehicle 10 to update the history data on the driving resistance included in the usage history data for the fuel cell vehicle 10 in the memory 22.

History data on the use of the fuel cell vehicle 10 may include, for example, history data on the gradient of the road surface traveled by the fuel cell vehicle 10. The amount of electrical energy produced by the fuel cell 11 of a fuel cell vehicle 10 can vary depending on the gradient of the road surface on which the fuel cell vehicle 10 has traveled. As the amount of electrical energy produced by the fuel cell 11 changes, the degree of deterioration of the fuel cell 11 can change. In other words, the history data on the gradient of the road surface traveled by the fuel cell vehicle 10 can be data related to the deterioration of the fuel cell 11. The controller 23 may identify the operation route driven by the fuel cell vehicle 10 using the operation schedule for the fuel cell vehicle 10. The controller 23 may acquire data on the gradient of the road surface of the identified operation route from the memory 22. The controller 23 may use the acquired data on the gradient of the road surface of the operation route to update the history data, on the gradient of the road surface traveled by the fuel cell vehicle 10, included in the usage history data for the fuel cell vehicle 10 in the memory 22.

The usage history data for the fuel cell vehicle 10 may include usage history data for the fuel cell 11. The controller 23 may control the communication interface 21 to receive the usage history data for the fuel cell 11 from the information processing apparatus 20 via the network 2. The controller 23 may use the received usage history data for the fuel cell 11 to update the usage history data for the fuel cell 11 included in the usage history data for the fuel cell vehicle 10 in the memory 22.

<Estimation Process>

The controller 23 executes an estimation process to estimate the degree of deterioration of the fuel cell 11 of the fuel cell vehicle 10 before executing the assignment process described below, for example. The degree of deterioration of the fuel cell 11 indicates the extent of deterioration of the fuel cell 11. The extent of deterioration of the fuel cell 11 may be greater as the degree of deterioration of the fuel cell 11 is higher. The degree of deterioration of the fuel cell 11 may be defined by the current-voltage characteristics of the fuel cell 11. The current-voltage characteristics of the fuel cell 11 indicate the relationship between the current value and the voltage value outputted from the fuel cell 11, as described above. For example, as the deterioration of the fuel cell 11 progresses, the internal resistance of the fuel cell 11 increases. The higher the internal resistance of the fuel cell 11, the lower the voltage value of the fuel cell 11 at a predetermined current value of the current-voltage characteristics. In other words, the more deteriorated a fuel cell 11 is, the lower the voltage value of the fuel cell 11 at a predetermined current value of the current-voltage characteristics. The degree of deterioration of the fuel cell 11 may therefore be given by the voltage value of the fuel cell 11 at a predetermined current value of the current-voltage characteristics.

The controller 23 may execute the estimation process to estimate the degree of deterioration of the fuel cell 11 of the fuel cell vehicle 10 based on the usage history data for a fuel cell vehicle 10. Here, as a fuel cell vehicle 10 is used more frequently, the deterioration of the fuel cell 11 of the fuel cell vehicle 10 can progress more. The degree of deterioration of the fuel cell 11 of a fuel cell vehicle 10 can therefore be estimated based on the usage history data for the fuel cell vehicle 10.

As an example, the controller 23 may estimate the degree of deterioration of the fuel cell 11 of the fuel cell vehicle 10 by correcting measured data on the degree of deterioration of the fuel cell using the usage history data for the fuel cell vehicle 10. The measured data on the degree of deterioration of the fuel cell may include data on the degree of deterioration of the fuel cell as measured by bench testing and usage history data for the fuel cell vehicle in which the fuel cell was mounted. The controller 23 may correct the measured degree of deterioration of the fuel cell based on the result of comparing the usage history data for the fuel cell vehicle having mounted therein the fuel cell whose degree of deterioration was measured by the bench test with the usage history data for the fuel cell vehicle 10. The controller 23 may acquire the measured degree of deterioration of the fuel cell after correction as the estimated degree of deterioration of the fuel cell 11. The measured degree of deterioration of the fuel cell may be the degree of deterioration of a fuel cell of a different type than the fuel cell 11 or of the same type as the fuel cell 11.

As another example, the controller 23 may estimate the degree of deterioration of the fuel cell 11 of the fuel cell vehicle 10 using a learning model. The learning model may be produced by machine learning so as to output the degree of deterioration of the fuel cell 11 of the fuel cell vehicle 10 upon input of the usage history data for the fuel cell vehicle 10. In this case, the controller 23 estimates the degree of deterioration of the fuel cell 11 by inputting the usage history data for the fuel cell vehicle 10 into the learning model and acquiring the degree of deterioration of the fuel cell 11 of the fuel cell vehicle 10 outputted from the learning model.

As yet another example, the controller 23 may receive, using the communication interface 21, data on the current-voltage characteristics of the fuel cell 11 from the fuel cell vehicle 10 via the network 2. The controller 23 may estimate the degree of deterioration of the fuel cell 11 by correcting the received data on the current-voltage characteristics of the fuel cell 11 using the usage history data for the fuel cell vehicle 10. The current-voltage characteristics of the fuel cell 11 might not be accurate, since the characteristics vary depending on states such as the accelerator position of the fuel cell vehicle 10 at the time the current-voltage characteristics are acquired. The degree of deterioration of the fuel cell 11 can be estimated accurately by correction of the data on the current-voltage characteristics of the fuel cell 11 using the usage history data for the fuel cell vehicle 10.

The controller 23 may store the estimated degree of deterioration of the fuel cell 11 of each of the fuel cell vehicles 10 in the memory 22.

Here, in the estimation process, the controller 23 may determine whether the estimated degree of deterioration of the fuel cell 11 is below a threshold. In a case in which the degree of deterioration of the fuel cell 11 is determined to be below a threshold, the controller 23 may transmit, to an external device via the network 2 using the communication interface 21, identification information for the fuel cell vehicle 10 that includes the fuel cell 11, together with a message prompting to replace the fuel cell 11. The threshold may be set based on the degree of deterioration of a fuel cell 11 that needs to be replaced. The threshold is, for example, 10% of the degree of deterioration of a normal fuel cell 11. The identification information for the fuel cell vehicle 10 may be any information that uniquely identifies the fuel cell vehicle 10.

<Assignment Process>

The controller 23 executes an assignment process to preferentially assign an operation route that places a smaller load on a fuel cell 11 among a plurality of operation routes to a fuel cell vehicle 10 including a fuel cell 11 that has a higher degree of deterioration among a plurality of fuel cell vehicles 10. For example, the controller 23 acquires, from the memory 22, the degree of deterioration of the fuel cell 11 of each of the fuel cell vehicles 10 and data on the load on the fuel cell 11 on each of the operation routes. The controller 23 may assign the operation route with the smaller load on the fuel cell 11 in order, starting with the fuel cell vehicle 10 with the highest degree of deterioration of the fuel cell 11.

The controller 23 may execute the assignment process at a second time set in advance. The second time may be at or after the time when the last bus finishes operation, but before the time when the first bus begins operation.

The controller 23 may execute the assignment process at each setting time interval set in advance. The setting time interval may be set according to the variation in the load on the fuel cell 11 on each of the operation routes.

The controller 23 may determine the operation schedule for the plurality of fuel cell vehicles 10, i.e. buses. The controller 23 may execute the assignment process when determining the operation schedule for the fuel cell vehicle 10.

(Operations of System)

FIG. 3 is a flowchart illustrating the operations of the information processing apparatus 20 illustrated in FIG. 2. The operations may correspond to an example of an information processing method according to the present embodiment.

At the first time, the controller 23 executes an update process to update the usage history data for each of the fuel cell vehicles 10 (step S1).

The controller 23 executes an estimation process to estimate the degree of deterioration of the fuel cell 11 of each of the fuel cell vehicles 10 based on the usage history data for each of the fuel cell vehicles 10 (step S2).

At the second time, the controller 23 executes an assignment process to preferentially assign an operation route that places a smaller load on a fuel cell 11 among a plurality of operation routes to a fuel cell vehicle 10 including a fuel cell 11 that has a higher degree of deterioration among a plurality of fuel cell vehicles 10 (step S3).

In this way, the controller 23 in the information processing apparatus 20 preferentially assigns an operation route that places a smaller load on a fuel cell 11 among a plurality of operation routes to a fuel cell vehicle 10 including a fuel cell 11 that has a higher degree of deterioration among a plurality of fuel cell vehicles 10. Such a configuration can equalize the degree of deterioration of the fuel cell 11 included in each of the fuel cell vehicles 10. According to the present embodiment, technology for equalizing the degree of deterioration of the fuel cell 11 included in each fuel cell vehicle 10 in a plurality of fuel cell vehicles 10 can be provided.

Furthermore, in the present embodiment, the controller 23 may execute the estimation process to estimate the degree of deterioration of the fuel cell 11 of the fuel cell vehicle 10 based on the usage history data for a fuel cell vehicle 10.

Here, the controller 23 can also acquire the degree of deterioration of the fuel cell 11 from the current-voltage characteristics of the fuel cell 11 acquired on the fuel cell vehicle 10. However, the current-voltage characteristics of the fuel cell 11 acquired on the fuel cell vehicle 10 can vary depending on states such as the accelerator position of the fuel cell vehicle 10 at the time the current-voltage characteristics are acquired. In other words, the current-voltage characteristics of the fuel cell 11 acquired on the fuel cell vehicle 10 might not be accurate. The degree of deterioration of the fuel cell 11 might therefore not be accurately acquired from the current-voltage characteristics of the fuel cell 11 acquired on the fuel cell vehicle 10. In contrast, the degree of deterioration of the fuel cell 11 can be accurately estimated in the present embodiment by estimating the degree of deterioration of the fuel cell 11 of a fuel cell vehicle 10 based on the usage history data for the fuel cell vehicle 10.

To acquire accurate current-voltage characteristics of the fuel cell 11, the fuel cell 11 must be removed from the fuel cell vehicle 10 and bench tested. In the present embodiment, the degree of deterioration of the fuel cell 11 can be acquired without bench testing by estimating the degree of deterioration of the fuel cell 11 of a fuel cell vehicle 10 based on the usage history data for the fuel cell vehicle 10.

In addition, the ECU of the fuel cell vehicle 10 has limited computational processing power. The ECU of the fuel cell vehicle 10 therefore might not be able to accurately estimate the degree of deterioration of the fuel cell 11. Since the controller 23 of the information processing apparatus 20 estimates the degree of deterioration of the fuel cell 11 in the present embodiment, the degree of deterioration of the fuel cell 11 is estimated more accurately than in a case of the ECU of the fuel cell vehicle 10 calculating the degree of deterioration of the fuel cell 11.

Furthermore, in the present embodiment, the controller 23 may update the usage history data for the fuel cell vehicle 10 at the first time. The degree of deterioration of the fuel cell 11 can be estimated accurately by updating of the usage history data of the fuel cell vehicle 10.

In the present embodiment, the controller 23 may estimate the degree of deterioration of the fuel cell 11 of the fuel cell vehicle 10 by correcting measured data on the degree of deterioration of the fuel cell using the usage history data for the fuel cell vehicle 10. When measured data on the degree of deterioration of the fuel cell is corrected using the usage history data for the fuel cell vehicle 10, the degree of deterioration of the fuel cell 11 can be estimated without measurement of data on the degree of deterioration of the fuel cell 11 by bench testing.

In the present embodiment, the controller 23 may also estimate the degree of deterioration of the fuel cell 11 of the fuel cell vehicle 10 using a learning model that outputs the degree of deterioration of the fuel cell 11 upon input of the usage history data for the fuel cell vehicle 10. The degree of deterioration of the fuel cell 11 can be more easily estimated with use of a learning model.

In the present embodiment, the controller 23 may determine whether the estimated degree of deterioration of the fuel cell 11 is below a threshold. In a case in which the estimated degree of deterioration of the fuel cell 11 is determined to be below a threshold, the controller 23 may transmit, to an external device via the network 2 using the communication interface 21, identification information for the fuel cell vehicle 10 that includes the fuel cell 11, together with a message prompting to replace the fuel cell 11. This configuration enables businesses and others to know when to replace the fuel cell 11.

In the present embodiment, the load on the fuel cell 11 on the operation route may be estimated based on the gradient of the road surface along the operation route. With such a configuration, the load on the fuel cell 11 on an operation route can more easily be estimated than in a case in which the load on the fuel cell 11 is acquired by the fuel cell vehicle 10 actually driving the operation route, for example.

In the present embodiment, the controller 23 may also execute the assignment process at each second time. Such a configuration can more accurately equalize the degree of deterioration of the fuel cell 11 included in each of the fuel cell vehicles 10. By the second time being set to, for example, at or after the time when the last bus finishes operation, but before the time when the first bus begins operation, an operation route can be efficiently assigned to each of the fuel cell vehicles 10.

In the present embodiment, the controller 23 may also execute the assignment process at each setting time interval. Such a configuration can more accurately equalize the degree of deterioration of the fuel cell 11 included in each of the fuel cell vehicles 10.

While the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each component, each step, or the like can be rearranged without logical inconsistency, and a plurality of components, steps, or the like can be combined into one or divided.

Examples of some embodiments of the present disclosure are described below. However, embodiments of the present disclosure are not limited to these examples.

[Appendix 1] An information processing apparatus comprising: a controller configured to execute an assignment process to preferentially assign an operation route that places a smaller load on a fuel cell among a plurality of operation routes to a fuel cell vehicle including a fuel cell that has a higher degree of deterioration among a plurality of fuel cell vehicles.

[Appendix 2] The information processing apparatus according to appendix 1, wherein the controller is configured to execute an estimation process to estimate the degree of deterioration of the fuel cell based on usage history data for the fuel cell vehicle.

[Appendix 3] The information processing apparatus according to appendix 1 or 2, wherein the controller is configured to execute an update process to update the usage history data for the fuel cell vehicle at a first time set in advance.

[Appendix 4] The information processing apparatus according to any one of appendices 1 to 3, wherein the controller is configured to execute the estimation process by correcting measured data on the degree of deterioration of the fuel cell using the usage history data for the fuel cell vehicle.

[Appendix 5] The information processing apparatus according to any one of appendices 1 to 4, wherein the controller is configured to execute the estimation process using a learning model that outputs the degree of deterioration of the fuel cell of the fuel cell vehicle upon input of the usage history data for the fuel cell vehicle.

[Appendix 6] The information processing apparatus according to any one of appendices 1 to 5, further comprising a communication interface, wherein in a case in which the estimated degree of deterioration of the fuel cell is below a threshold, the controller is configured to transmit, to an external device via the communication interface, identification information for the fuel cell vehicle that includes the fuel cell for which the degree of deterioration was estimated, together with a message prompting to replace the fuel cell.

[Appendix 7] The information processing apparatus according to any one of appendices 1 to 6, wherein the load on the fuel cell on the operation route is estimated based on a gradient of a road surface on the operation route.

[Appendix 8] The information processing apparatus according to any one of appendices 1 to 7, wherein the controller is configured to execute the assignment process at each second time set in advance.

[Appendix 9] The information processing apparatus according to any one of appendices 1 to 8, wherein the controller is configured to execute the assignment process at each setting time interval set in advance.

[Appendix 10] The information processing apparatus according to any one of appendices 1 to 9, wherein the plurality of fuel cell vehicles are a plurality of buses, and the plurality of operation routes are bus operation routes.

[Appendix 11] The information processing apparatus according to any one of appendices 1 to 10, wherein the controller is configured to determine an operation schedule for the plurality of buses.

[Appendix 12] A system comprising: the information processing apparatus according to any one of appendices 1 to 11; and a plurality of fuel cell vehicles.

[Appendix 13] An information processing method comprising: executing an assignment process to preferentially assign an operation route that places a smaller load on a fuel cell among a plurality of operation routes to a fuel cell vehicle including a fuel cell that has a higher degree of deterioration among a plurality of fuel cell vehicles.

[Appendix 14] The information processing method according to appendix 13, further comprising executing an estimation process to estimate the degree of deterioration of the fuel cell based on usage history data for the fuel cell vehicle.

[Appendix 15] The information processing method according to appendix 13 or 14, further comprising executing an update process to update the usage history data for the fuel cell vehicle at a first time set in advance.

[Appendix 16] The information processing method according to any one of appendices 13 to 15, wherein the estimation process is executed by correcting measured data on the degree of deterioration of the fuel cell using the usage history data for the fuel cell vehicle.

[Appendix 17] The information processing method according to any one of appendices 13 to 16, wherein the estimation process is executed using a learning model that outputs the degree of deterioration of the fuel cell of the fuel cell vehicle upon input of the usage history data for the fuel cell vehicle.

[Appendix 18] The information processing method according to any one of appendices 13 to 17, further comprising transmitting, to an external device, in a case in which the estimated degree of deterioration of the fuel cell is below a threshold, identification information for the fuel cell vehicle that includes the estimated fuel cell, together with a message prompting to replace the fuel cell.

[Appendix 19] The information processing method according to any one of appendices 13 to 18, wherein the assignment process is executed at each second time set in advance.

[Appendix 20] The information processing method according to any one of appendices 13 to 19, wherein the assignment process is executed at each setting time interval set in advance.

The invention claimed is:

1. An information processing apparatus, comprising:
a controller configured to execute an assignment process to preferentially assign an operation route that places a smaller load on a fuel cell among a plurality of operation routes to a fuel cell vehicle including a fuel cell that has a higher degree of deterioration among a plurality of fuel cell vehicles, and
a communication interface, wherein
the controller is configured to
execute an estimation process to estimate the degree of deterioration of the fuel cell based on usage history data for the fuel cell vehicle, and
in response to the estimated degree of deterioration of the fuel cell being below a threshold, transmit, to an external device via the communication interface, identification information for the fuel cell vehicle that includes the fuel cell for which the degree of deterioration was estimated, together with a message prompting to replace the fuel cell, and
the usage history data for the fuel cell vehicle includes history data of an on-board weight of the fuel cell vehicle and a water temperature of the fuel cell.

2. The information processing apparatus according to claim 1, wherein
the controller is configured to execute an update process to update the usage history data for the fuel cell vehicle at a first time set in advance.

3. An information processing method, comprising:
executing an assignment process to preferentially assign an operation route that places a smaller load on a fuel cell among a plurality of operation routes to a fuel cell vehicle including a fuel cell that has a higher degree of deterioration among a plurality of fuel cell vehicles;
executing an estimation process to estimate the degree of deterioration of the fuel cell based on usage history data for the fuel cell vehicle; and
in response to the estimated degree of deterioration of the fuel cell being below a threshold, transmitting, to an external device via a communication interface, identification information for the fuel cell vehicle that includes the fuel cell for which the degree of deterioration was estimated, together with a message prompting to replace the fuel cell, wherein
the usage history data for the fuel cell vehicle includes history data of an on-board weight of the fuel cell vehicle and a water temperature of the fuel cell.

4. The information processing method according to claim 3, wherein
the estimation process is executed by correcting measured data on the degree of deterioration of the fuel cell using the usage history data for the fuel cell vehicle.

5. The information processing method according to claim 3, wherein
in response to an input of the usage history data for the fuel cell vehicle, the estimation process is executed using a learning model that outputs the degree of deterioration of the fuel cell of the fuel cell vehicle.

6. The information processing apparatus according to claim 1, wherein
the controller is configured to execute the estimation process by correcting measured data on the degree of deterioration of the fuel cell using the usage history data for the fuel cell vehicle.

7. The information processing apparatus according to claim 1, wherein
the controller is configured to, in response to an input of the usage history data for the fuel cell vehicle, execute the estimation process using a learning model that outputs the degree of deterioration of the fuel cell of the fuel cell vehicle.

8. The information processing apparatus according to claim 1, wherein
the load on the fuel cell on the operation route is estimated based on a gradient of a road surface on the operation route.

9. The information processing apparatus according to claim 1, wherein
the controller is configured to execute the assignment process at each second time set in advance.

10. The information processing apparatus according to claim 1, wherein
the controller is configured to execute the assignment process at each setting time interval set in advance.

11. The information processing apparatus according to claim 1, wherein
the plurality of fuel cell vehicles is a plurality of buses, and the plurality of operation routes is bus operation routes.

12. The information processing apparatus according to claim 11, wherein
the controller is configured to determine an operation schedule for the plurality of buses.

13. The information processing apparatus according to claim 1, wherein
the usage history data for the fuel cell vehicle further includes at least one of:
history data of an accelerator position of the fuel cell vehicle, or
history data of a driving resistance of the fuel cell vehicle.

14. The information processing apparatus according to claim 13, wherein
the usage history data for the fuel cell further includes at least one of:
data of a number of times the fuel cell was switched to a power generating state or a non-power generating state,
history data of a driving of injectors for the fuel cell, or
history data of a driving of auxiliary equipment of the fuel cell.

15. A system, comprising:
an information processing apparatus; and
a plurality of fuel cell vehicles, wherein the information processing apparatus comprises:
a controller configured to execute an assignment process to preferentially assign an operation route that places a smaller load on a fuel cell among a plurality of operation routes to a fuel cell vehicle including a fuel cell that has a higher degree of deterioration among the plurality of fuel cell vehicles, and
a communication interface,
the controller is configured to
execute an estimation process to estimate the degree of deterioration of the fuel cell based on usage history data for the fuel cell vehicle, and
in response to the estimated degree of deterioration of the fuel cell being below a threshold, transmit, to an external device via the communication interface, identification information for the fuel cell vehicle that includes the fuel cell for which the degree of deterioration was estimated, together with a message prompting to replace the fuel cell, and
the usage history data for the fuel cell vehicle includes history data of an on-board weight of the fuel cell vehicle and a water temperature of the fuel cell.

16. The information processing method according to claim 3, further comprising:
executing an update process to update the usage history data for the fuel cell vehicle at a first time set in advance.

17. The information processing method according to claim 16, wherein
the assignment process is executed at each second time set in advance.

18. The information processing method according to claim 16, wherein
the assignment process is executed at each setting time interval set in advance.

19. The information processing method according to claim 16, wherein
the usage history data for the fuel cell vehicle further includes at least one of:
history data of an accelerator position of the fuel cell vehicle, or
history data of a driving resistance of the fuel cell vehicle.

20. The information processing method according to claim 19, wherein
the usage history data for the fuel cell further includes at least one of:
data of a number of times the fuel cell was switched to a power generating state or a non-power generating state,
history data of a driving of injectors for the fuel cell, or history data of a driving of auxiliary equipment of the fuel cell.

* * * * *